United States Patent
Brück et al.

(10) Patent No.: US 12,092,004 B2
(45) Date of Patent: Sep. 17, 2024

(54) EXHAUST GAS AFTERTREATMENT DEVICE

(71) Applicant: Vitesco Technologies GmbH, Regensburg (DE)

(72) Inventors: Rolf Brück, Bergisch Gladbach (DE); Peter Hirth, Rösrath (DE); Ines Lienou Lzeutchi, Rüscheid (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/038,276

(22) PCT Filed: Nov. 19, 2021

(86) PCT No.: PCT/EP2021/082280
§ 371 (c)(1),
(2) Date: May 23, 2023

(87) PCT Pub. No.: WO2022/112124
PCT Pub. Date: Jun. 2, 2022

(65) Prior Publication Data
US 2023/0407777 A1    Dec. 21, 2023

(30) Foreign Application Priority Data
Nov. 26, 2020   (DE) .................... 10 2020 214 870.8

(51) Int. Cl.
*F01N 13/00*   (2010.01)
*F01N 3/031*   (2006.01)
(Continued)

(52) U.S. Cl.
CPC ......... *F01N 13/0093* (2014.06); *F01N 3/031* (2013.01); *F01N 3/0835* (2013.01); *F01N 3/101* (2013.01); *F01N 3/2053* (2013.01)

(58) Field of Classification Search
CPC .............. F01N 13/0093; F01N 13/009; F01N 13/0097; F01N 3/031; F01N 3/0835;
(Continued)

(56) References Cited

U.S. PATENT DOCUMENTS 5,634,331 A   6/1997  Aoki et al.
5,916,129 A   6/1999  Modica et al.
(Continued)

FOREIGN PATENT DOCUMENTS

DE    69426609    8/2001
DE    10134079    1/2003
(Continued)

OTHER PUBLICATIONS

Office Action of corresponding German Patent Application No. 10 2020 214 870.8.

*Primary Examiner* — Dapinder Singh
(74) *Attorney, Agent, or Firm* — Cozen O'Connor

(57) ABSTRACT

A device for the aftertreatment of exhaust gases of an internal combustion engine, with an exhaust gas line, which is configured to feed the exhaust gas expelled from the internal combustion engine to at least one component for exhaust gas aftertreatment. The at least one adsorber for the temporary storage of hydrocarbons contained in the exhaust gas, a catalytic converter for the catalytic aftertreatment of the exhaust gas, an electrically heatable catalytic converter and a cracking catalytic converter for cracking long-chain hydrocarbons into shorter-chain hydrocarbons are arranged in the exhaust gas line.

10 Claims, 2 Drawing Sheets

(51) Int. Cl.
*F01N 3/08* (2006.01)
*F01N 3/10* (2006.01)
*F01N 3/20* (2006.01)

(58) Field of Classification Search
CPC ........ F01N 3/101; F01N 3/2053; F01N 3/035;
F01N 3/2066; F01N 3/0814; F01N 3/027;
F01N 3/2006; F01N 5/02; F01N 9/00;
F01N 2510/0684; F01N 2240/16; F01N
2240/14; F01N 2240/28; F01N 2240/30;
F01N 2240/00; Y02T 10/12; Y02T 10/40;
Y02A 50/20
See application file for complete search history.

(56) References Cited

U.S. PATENT DOCUMENTS

| | | | | |
|---|---|---|---|---|
| 8,409,515 | B2* | 4/2013 | Ren | F01N 3/0222 422/177 |
| 9,080,524 | B2* | 7/2015 | Yezerets | B01J 38/06 |
| 2002/0170286 | A1* | 11/2002 | Docter | F01N 3/206 60/275 |
| 2006/0248877 | A1* | 11/2006 | Nagel | F01N 3/0842 60/299 |
| 2008/0072575 | A1* | 3/2008 | Yan | F01N 13/0093 60/272 |
| 2009/0293454 | A1* | 12/2009 | Shimoda | F01N 3/0842 60/297 |
| 2011/0126513 | A1 | 6/2011 | Lee et al. | |
| 2012/0216514 | A1* | 8/2012 | Armanini | F01N 3/2066 60/297 |
| 2013/0318947 | A1* | 12/2013 | Malik | F01N 3/0892 60/275 |
| 2015/0211402 | A1 | 7/2015 | Yahata et al. | |

FOREIGN PATENT DOCUMENTS

| | | |
|---|---|---|
| EP | 1558842 | 4/2008 |
| EP | 1170472 | 1/2022 |
| JP | H08131837 | 5/1996 |
| WO | WO 9508702 | 3/1995 |

* cited by examiner

EXHAUST GAS AFTERTREATMENT DEVICE

CROSS REFERENCE TO RELATED APPLICATIONS

This is a U.S. national stage of Application No. PCT/EP2021/082280 filed Nov. 19, 2021. Priority is claimed on German Application No. DE 10 2020 214 870.8 filed Nov. 26, 2020 the content of which is incorporated herein by reference.

BACKGROUND OF THE INVENTION

1. Field of the Invention

The disclosure relates to a device for the aftertreatment of exhaust gases of an internal combustion engine, with an exhaust gas line, which is configured to feed the exhaust gas expelled from the internal combustion engine to at least one component for exhaust gas aftertreatment, wherein at least one adsorber for the temporary storage of hydrocarbons contained in the exhaust gas, a catalytic converter for the catalytic aftertreatment of the exhaust gas, an electrically heatable catalytic converter and a cracking catalytic converter for cracking long-chain hydrocarbons into shorter-chain hydrocarbons are arranged in the exhaust gas line.

2. Description of the Related Art

For the purpose of exhaust gas aftertreatment of internal combustion engines, what are referred to as hydrocarbon adsorbers (HC adsorbers) are used in exhaust gas systems. These adsorbers are used to temporarily store hydrocarbons at low exhaust gas temperatures, for example during the cold-start phase, in order in this way to prevent the hydrocarbons from escaping into the environment. Hydrocarbons, which are, in particular, unburnt residues of the fuel, are usually chemically reacted in the exhaust gas system over a catalyst provided for this purpose, giving rise to products which are less harmful to the environment. These catalytic converters operate reliably only from a certain minimum temperature, referred to as the light-off temperature.

In order to avoid the uncontrolled discharge of hydrocarbons present in the exhaust gas into the environment in exhaust systems, the aim is therefore to temporarily store the hydrocarbons until the light-off temperature is reached, thus enabling them then to be reacted over the catalyst suitable for this purpose.

The hydrocarbons contained in the exhaust gas are both short-chain and long-chain hydrocarbons. The short-chain hydrocarbons are adsorbed to a lesser extent by known hydrocarbon adsorbers and are therefore already desorbed again at relatively low temperatures. Long-chain hydrocarbons, on the other hand, are bound more strongly and are thus desorbed again only at relatively high temperatures. Furthermore, depending on the chain length of the hydrocarbons and on the chemical composition of the storage body of the adsorber, the adsorber may not be completely emptied, with the result that the concentration of hydrocarbons downstream of the adsorber is higher than upstream of this adsorber at the next engine start.

This has the effect that, in the event of a gradual rise in temperature of the laden adsorber, first the short-chain hydrocarbons and then, in the event of a further rise in temperature, the long-chain hydrocarbons are desorbed again. This can lead to preferential retention of long-chain hydrocarbons in the adsorber, which is disadvantageous since long-chain hydrocarbons tend to agglomerate with one another and to carbonize in the pores of the adsorber. This leads to a decrease in the storage capacity of the HC adsorber over its lifetime.

SUMMARY OF THE INVENTION

The problem addressed by the present disclosure is therefore that of providing a device for exhaust gas aftertreatment which makes it possible to crack long-chain hydrocarbons, the intention being thereby to improve the adsorption and desorption on an adsorber for hydrocarbons.

One exemplary aspect of the invention relates to a device for the aftertreatment of exhaust gases of an internal combustion engine, with an exhaust gas line, which is configured to feed the exhaust gas expelled from the internal combustion engine to at least one component for exhaust gas aftertreatment, wherein at least one adsorber for the temporary storage of hydrocarbons contained in the exhaust gas, a catalytic converter for the catalytic aftertreatment of the exhaust gas, an electrically heatable catalytic converter and a cracking catalytic converter for cracking long-chain hydrocarbons into shorter-chain hydrocarbons are arranged in the exhaust gas line.

A cracking catalytic converter essentially serves to crack long-chain hydrocarbons, such as are contained in the exhaust gas as unburnt residues of the fuel. Hydrocarbons or the hydrocarbon molecules have chains of carbon atoms of different lengths, carbon atoms being bonded to one another and the respective free bonds of the carbon being occupied by hydrogen atoms or other molecular groups.

The longer the hydrocarbon chains are, the more difficult they are for the adsorber to adsorb. Moreover, a higher temperature at the adsorber is necessary for the desorption of long-chain hydrocarbons. Short-chain hydrocarbons are adsorbed more quickly and also desorbed again at a lower temperature level. This makes the adsorber more efficient overall since it is effective more quickly after an engine start, e.g. after a cold start, and at the same time the risk of long-chain hydrocarbons remaining in the adsorber and clogging it is reduced.

In particular, if the operating time of the internal combustion engine is short, it may be that a sufficiently high temperature level is not reached at the adsorber, with the result that all the adsorbed hydrocarbons are desorbed again. In this case, a portion of the hydrocarbons remains in the adsorber. When the internal combustion engine is restarted, there may then be a higher concentration of hydrocarbons downstream of the adsorber in the direction of flow than in the direction of flow upstream, since both the newly added hydrocarbons and the hydrocarbons still present in the adsorber, which additionally flow into the exhaust gas line when the desorption temperature is reached, are present downstream of the adsorber.

The cracking catalytic converter is arranged upstream of the adsorber in the direction of flow of the exhaust gas. The cracking catalytic converter is preferably the first component through which the exhaust gas flows, so that cracking takes place as early as possible.

It is particularly advantageous if the reaction surfaces of the cracking catalytic converter are coated with activated aluminum silicates. Aluminum silicates or "zeolites" are particularly suitable for cracking hydrocarbons in a reaction that takes place at the reaction surface of the catalytic converter. The reaction surfaces are the surfaces over which the exhaust gas flows. If the cracking catalytic converter is formed, for example, by a honeycomb body through which flow can take place, the walls delimiting the flow channels form the reaction surfaces.

An aluminum silicate is, for example, chromium oxide ($Cr_2O_3$). Other aluminum silicates can also be used to advantage.

It is also advantageous if the exhaust gas line has a bypass channel, wherein the latter branches off from the exhaust gas line downstream of the electrically heatable catalytic converter and has a cracking catalytic converter, a cooling element and an adsorber, and opens into the exhaust gas line upstream of the electrically heatable catalytic converter. Such a bypass allows the recirculation of the exhaust gas through the cracking catalytic converter and the remaining components arranged in the bypass channel for exhaust gas aftertreatment, and it is thereby possible, on the one hand, to improve exhaust gas purification. Moreover, further long-chain hydrocarbons which have not yet been cracked can be cracked in the cracking catalytic converter. As a result of the branching off into the bypass channel directly downstream of the electrically heatable catalytic converter, it is possible to achieve a sufficiently high temperature level in the bypass channel as early as possible, thereby making it possible to react the carbon monoxides, in particular, very early at the cracking catalytic converter.

Elements for controlling the exhaust gas flow can be provided, for example flaps or valves, by which the exhaust gas flow is divided between the main channel and the bypass channel.

One preferred exemplary embodiment is characterized in that the cracking catalytic converter is configured to crack long-chain hydrocarbons in the exhaust gas with in each case eight to twelve carbon atoms into hydrocarbons with a maximum of seven carbon atoms. Reducing the average length of the hydrocarbons contributes to improving adsorption and thus temporary storage. Moreover, the presence of predominantly short-chain hydrocarbons having seven or fewer carbon atoms in a chain significantly reduces the risk of carbonization of the adsorber since the short-chain hydrocarbons desorb again already at relatively low temperatures.

It is also preferable if the desorption temperature of the adsorber is in a temperature range of 150 degrees Celsius to 200 degrees Celsius. A desorption temperature in the range from 150 to 200 degrees Celsius is advantageous since this temperature range is reached more quickly and thus desorption can take place more promptly.

The desorption of uncracked long-chain hydrocarbons, predominantly with more than seven carbon atoms in a chain, usually takes place in higher temperature ranges, which range, for example, up to 400 degrees Celsius. Significantly more time passes before such a high temperature level is reached. Moreover, it may be that in certain operating situations these high temperatures are not reached at all and thus complete desorption does not occur.

In contrast, the cracked hydrocarbons are thus released from the adsorber earlier and, furthermore, complete discharge of the adsorber is achieved more quickly. This counteracts, in particular, the carbonization of the adsorber and thus increases the durability of the system.

In addition, it is advantageous if the light-off temperature at which the cracking of the hydrocarbons begins is 100 degrees Celsius. This temperature is preferably as low as possible so that the hydrocarbons are cracked as early as possible.

It is furthermore advantageous if the exhaust gas line downstream of the cracking catalytic converter has a cooling element, by which the exhaust gas flowing out of the cracking catalytic converter can be cooled. The cracking or breaking up of the carbon chains produces heat. This is also released, inter alia, into the exhaust gas line. In order to avoid affecting the adsorption and desorption at the adsorber, active cooling can be provided in order to compensate for the additional heat input due to the chemical reaction of cracking the carbon chains.

It is also expedient if the cracking catalytic converter is embodied as a tubular reactor, wherein a coolant can flow through the tubular reactor. In particular, a tubular reactor has the advantage that, in addition to the actual chemical reaction, active cooling can also be provided in that there can be flow of cooling medium through casing surfaces of the tubular reactor or intermediate spaces between flow channels. It is thus possible, in particular, to achieve a compact design with a combination of functions.

Advantageous refinements of the present invention are described in the dependent claims and in the following description of the figures.

BRIEF DESCRIPTION OF THE DRAWINGS

The invention will be discussed in detail below on the basis of exemplary embodiments with reference to the drawings, in which.

DETAILED DESCRIPTION OF THE PRESENTLY PREFERRED EMBODIMENTS

Figure 1:
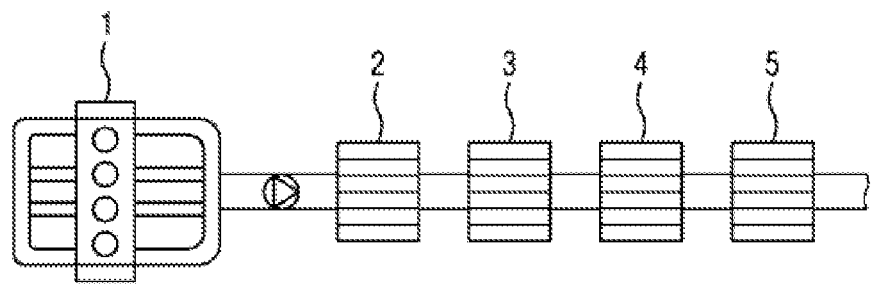
FIG. 1 is a schematic illustration of an exhaust gas system from the internal combustion engine through different components for exhaust gas aftertreatment.

FIG. 1 shows one possible embodiment of an exhaust system. Reference sign 1 indicates the internal combustion engine, from where the exhaust gas from the individual cylinders flows through the exhaust manifold in a tubular exhaust gas line. The first component for exhaust gas aftertreatment is a cracking catalytic converter 2, which is suitable for cracking long-chain hydrocarbons. An adsorber 3 for adsorbing hydrocarbons present in the exhaust gas is arranged downstream of the cracking catalytic converter 2 in the direction of flow. Following this in the exemplary embodiment of FIG. 1 are an electric heating catalytic converter 4 and a three-way catalytic converter 5, which can be arranged in any order. After flowing through the individual components for exhaust gas aftertreatment, the exhaust gas then flows through the exhaust into the environment.

Figure 2:
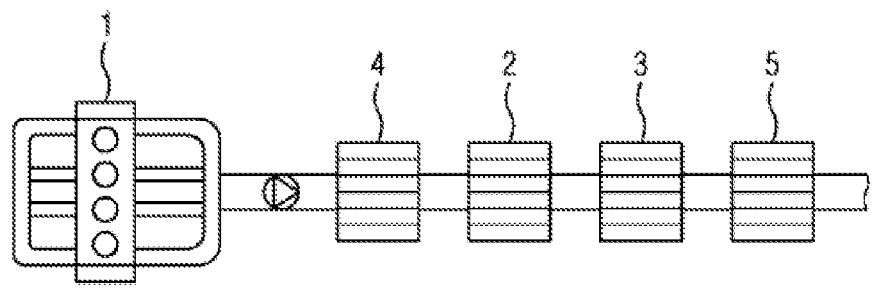
FIG. 2 is an alternative embodiment of an exhaust gas system.

FIG. 2 shows a different arrangement of the components for exhaust gas aftertreatment. Since the same components are used as in FIG. 1, identical components are provided with the same reference signs.

An electric heating catalytic converter 4 and/or a three-way catalytic converter 5 are/is arranged downstream of the internal combustion engine 1. Arranged downstream thereof are a cracking catalytic converter 2 and an adsorber 3. An electric heating catalytic converter 4 and/or a three-way catalytic converter 5 can in turn be arranged downstream of the adsorber 3.

Figure 3:
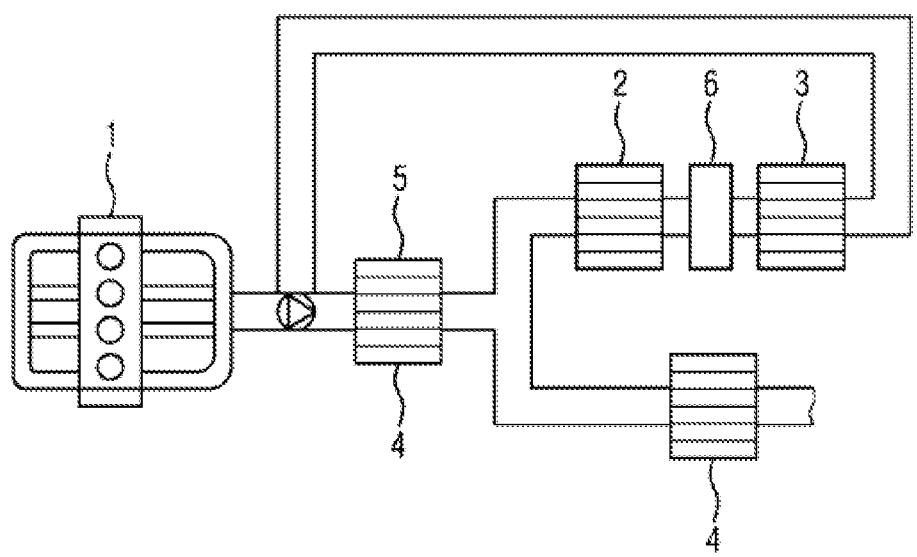
FIG. 3 is a further alternative embodiment of an exhaust gas system.

FIG. 3 shows a further alternative arrangement, wherein the exhaust gas line has a main channel, in which an electrically heatable catalytic converter 4 and a three-way catalytic converter 5 are arranged. In addition, a bypass channel is shown, in which a cracking catalytic converter 2, a cooler 6 and an adsorber 3, for example an HC adsorber, are arranged. The bypass channel branches off downstream of the electrically heatable catalytic converter 4 and opens back into the main channel upstream of the electrically heatable catalytic converter 4. The adsorber 3 and the cracking catalytic converter 2 form an additional heat capacity. Since the carbon monoxides are to be reacted as early and completely as possible at the cracking catalytic converter 2, branching off into the bypass channel only takes place downstream of the electrically heatable catalytic converter 4.

The adsorber is used to store as much of the hydrocarbons as possible during the cold-start phase. For this purpose, the temperature in the adsorber should be kept low so that the adsorber does not desorb too quickly. Thus, the adsorber is deliberately positioned further back. After the cold-start phase, the adsorber, the cracking catalytic converter and the cooler are longer of any use since the exhaust gas temperature is already very high (they will only have an additional, unwanted heat capacity for CO and HC). In this case, only the main flow continues to be used.

The different features of the individual exemplary aspects can also be combined with one another.

The exemplary embodiments in FIGS. 1 to 3 have in particular no limiting character and serve to illustrate the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for aftertreatment of exhaust gas of an internal combustion engine, comprising:
    an exhaust gas line, which is configured to feed the exhaust gas expelled from the internal combustion engine to at least one component for exhaust gas aftertreatment, wherein arranged in the exhaust gas line are:
    at least one adsorber configured to temporarily store of hydrocarbons contained in the exhaust gas;
    a catalytic converter for catalytic aftertreatment of the exhaust gas;
    an electrically heatable catalytic converter; and
    a cracking catalytic converter configured to crack long-chain hydrocarbons into shorter-chain hydrocarbons.

2. The device as claimed in claim 1, wherein reaction surfaces of the cracking catalytic converter are coated with activated aluminum silicates.

3. The device as claimed in claim 1, wherein the cracking catalytic converter is configured to crack long-chain hydrocarbons in the exhaust gas within each case eight to twelve carbon atoms into hydrocarbons with a maximum of 7 carbon atoms.

4. The device as claimed in claim 1, wherein a desorption temperature of the at least one adsorber is in a temperature range of 150 degrees Celsius to 200 degrees Celsius.

5. The device as claimed in claim 1, wherein a light-off temperature at which cracking of the hydrocarbons in the cracking catalytic converter begins is 100 degrees Celsius.

6. The device as claimed in claim 1, wherein the exhaust gas line downstream of the cracking catalytic converter has a cooling element, by which the exhaust gas flowing out of the cracking catalytic converter is cooled.

7. The device as claimed in claim 1, wherein the cracking catalytic converter is a tubular reactor, wherein a coolant can flow through the tubular reactor.

8. The device as claimed in claim 1, wherein the cracking catalytic converter is arranged upstream of the catalytic converter for catalytic aftertreatment of the exhaust gas.

9. The device as claimed in claim 1, wherein the cracking catalytic converter comprises reaction surfaces coated with at least one of one of zeolites and activated aluminum silicates.

10. A device for aftertreatment of exhaust gas of an internal combustion engine, comprising:
    an exhaust gas line, which is configured to feed the exhaust gas expelled from the internal combustion engine to at least one component for exhaust gas aftertreatment, wherein arranged in the exhaust gas line are:
    at least one adsorber configured to temporarily store of hydrocarbons contained in the exhaust gas;
    a catalytic converter for catalytic aftertreatment of the exhaust gas;
    an electrically heatable catalytic converter; and
    a cracking catalytic converter configured to crack long-chain hydrocarbons into shorter-chain hydrocarbons,
    wherein the exhaust gas line further comprises a bypass channel that branches off from the exhaust gas line downstream of the electrically heatable catalytic converter and has the cracking catalytic converter, a cooling element, and the at least one adsorber and opens into the exhaust gas line upstream of the electrically heatable catalytic converter.

* * * * *